(12) United States Patent
Ham et al.

(10) Patent No.: US 10,717,858 B2
(45) Date of Patent: Jul. 21, 2020

(54) THERMOPLASTIC RESIN COMPOSITION AND MOLDED ARTICLE USING THE SAME

(71) Applicant: Lotte Advanced Materials Co., Ltd., Yeosu-si (KR)

(72) Inventors: Min Kyoung Ham, Uiwang-si (KR); Young Chul Kwon, Uiwang-si (KR); Yeon Wook Chung, Uiwang-si (KR); Dong Hui Chu, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 511 days.

(21) Appl. No.: 15/393,559

(22) Filed: Dec. 29, 2016

(65) Prior Publication Data

US 2017/0190895 A1   Jul. 6, 2017

(30) Foreign Application Priority Data

Dec. 31, 2015   (KR) .......................... 10-2015-0191450

(51) Int. Cl.

| | |
|---|---|
| *C08L 25/12* | (2006.01) |
| *C08L 51/04* | (2006.01) |
| *C08K 3/08* | (2006.01) |
| *C08K 3/40* | (2006.01) |
| *C08K 7/14* | (2006.01) |
| *C08F 230/08* | (2006.01) |
| *C08F 212/08* | (2006.01) |
| *C08F 220/44* | (2006.01) |

(52) U.S. Cl.
CPC ............ *C08L 25/12* (2013.01); *C08F 212/08* (2013.01); *C08F 220/44* (2013.01); *C08F 230/08* (2013.01); *C08K 3/08* (2013.01); *C08K 3/40* (2013.01); *C08K 7/14* (2013.01); *C08L 51/04* (2013.01); *C08K 2003/0806* (2013.01); *C08L 2205/025* (2013.01); *C08L 2205/03* (2013.01)

(58) Field of Classification Search
CPC ... C08K 3/08; C08K 3/40; C08K 7/14; C08K 2003/0806; C08L 51/04; C08L 25/12; C08L 2205/025; C08L 2205/03; C08F 212/08; C08F 220/44; C08F 230/08
USPC ........................................................ 524/439
See application file for complete search history.

(56) References Cited

U.S. PATENT DOCUMENTS

| | | | |
|---|---|---|---|
| 8,557,912 B2 | 10/2013 | Chung et al. | |
| 9,783,668 B2 | 10/2017 | Park et al. | |
| 2007/0276083 A1 | 11/2007 | Higashi et al. | |
| 2014/0179856 A1* | 6/2014 | Park .......................... | C08K 7/14 524/494 |
| 2015/0005435 A1 | 1/2015 | Park et al. | |
| 2015/0344685 A1* | 12/2015 | Lee .......................... | C08L 55/02 524/188 |

FOREIGN PATENT DOCUMENTS

| | | |
|---|---|---|
| CN | 102329462 A | 1/2012 |
| JP | 2001-262003 A | 9/2001 |
| JP | 2007-137963 A | 6/2007 |
| JP | 2007-197963 A | 8/2007 |
| KR | 10-2012-0006839 A | 1/2012 |
| KR | 10-2015-0002267 A | 1/2015 |

OTHER PUBLICATIONS

Office Action in counterpart Korean Application No. 10-2015-0191450 dated Jan. 18, 2018, pp. 1-5.
Office Action in counterpart Chinese Application No. 201611247650.1 dated Aug. 2, 2018, pp. 1-6.

* cited by examiner

*Primary Examiner* — Angela C Scott
(74) *Attorney, Agent, or Firm* — Additon, Higgins & Pendleton, P.A.

(57) ABSTRACT

A thermoplastic resin composition and a molded article produced using the same. The thermoplastic resin composition includes: a styrene-based copolymer resin; a rubber-modified acrylic graft copolymer; a silicone compound-containing branched copolymer; glass fibers; and metal particles, wherein a weight ratio of the branched copolymer to the glass fibers ranges from about 1:1 to about 6:1.

13 Claims, No Drawings

THERMOPLASTIC RESIN COMPOSITION AND MOLDED ARTICLE USING THE SAME

CROSS-REFERENCE TO RELATED APPLICATION

This application claims priority under 35 USC Section 119 to and the benefit of Korean Patent Application 10-2015-0191450, filed on Dec. 31, 2015, in the Korean Intellectual Property Office, the entire disclosure of which is incorporated herein by reference.

FIELD

The present invention relates to a thermoplastic resin composition and a molded article produced using the same.

BACKGROUND

A thermoplastic resin has a lower specific gravity than glass or metal and has excellent moldability and mechanical properties such as impact resistance. Plastic products made using a thermoplastic resin such a polycarbonate resin are rapidly replacing glass and metal products in the fields of electrical/electronic products and automotive parts.

Recently, as the importance of design becomes more prominent, there is increasing demand for plastic materials that can express various textures. For example, there is a growing demand for plastic exterior products that can create metal textures to give a more luxurious feel. In order to realize a metal texture on a plastic exterior product, there has been proposed a method of producing a molded article using a plastic resin and then coating the molded article with metal or metal paint.

However, such a metal-coated molded article has a problem in that a complicated coating process is required, harmful solvents are used, and manufacturing costs are high. In addition, the use of a painted plastic exterior material can cause significant deterioration in appearance quality due to scratches on a painted portion even by slight impact.

In order to solve such problems, there has been proposed a resin composition capable of expressing an appearance having a metal texture by adding metal particles to the resin without coating. For example, a resin composition using scaly fine metal particles and a resin composition using glass fibers and metal particles have been developed. However, these compositions have drawbacks in that flow marks or weld lines are generated during injection molding, causing deterioration in appearance characteristics.

In addition, with increasing demand for aesthetically pleasing products, there is growing demand for low-gloss resins for presentation of an emotional atmosphere and anti-glare. Further, with increasing awareness of environmental issues, low-gloss resins prepared without matte coatings or padding processes are increasingly used.

A method of imparting low-gloss properties to a resin composition by adding a specific rubber component to the resin composition has been proposed. However, such a method has a problem in that sufficient low-gloss effects cannot be obtained and other physical properties such as impact strength and heat resistance are likely to be deteriorated.

Therefore, there is a need for a resin composition which can express a low-gloss metal texture without causing appearance defects such as flow marks or weld lines.

SUMMARY OF THE INVENTION

Exemplary embodiments of the present invention provide a thermoplastic resin composition which can express a low-gloss metal texture without causing (or minimizing) appearance defects such as flow marks or weld lines, and a molded article which is produced using the thermoplastic resin composition and can have excellent appearance quality and realize a low-gloss metal texture.

The thermoplastic resin composition includes: a styrene-based copolymer resin; a rubber-modified acrylic graft copolymer; a silicone compound-containing branched copolymer; glass fibers; and metal particles, wherein a weight ratio of the branched copolymer to the glass fibers ranges from about 1:1 to about 6:1.

In exemplary embodiments, the rubber-modified acrylic graft copolymer may include a first rubber-modified acrylic graft copolymer having a core-shell structure and a second rubber-modified acrylic graft copolymer having a core-shell structure, wherein the first rubber-modified acrylic graft copolymer and the second rubber-modified acrylic graft copolymer may have different core components and/or different core sizes.

In exemplary embodiments, the first rubber-modified acrylic graft copolymer may have an average core diameter of about 100 to about 250 nm and the second rubber-modified acrylic graft copolymer may have an average core diameter of about 251 nm to about 400 nm.

In exemplary embodiments, the first rubber-modified acrylic graft copolymer may have a double core and the second rubber-modified acrylic graft copolymer may have a triple core.

In exemplary embodiments, the double core may include an inner core layer formed by copolymerizing an alkyl (meth)acrylate monomer with an aromatic vinyl monomer and an outer core layer composed of an alkyl (meth)acrylate polymer, and the triple core may include a first core layer composed of an alkyl (meth)acrylate polymer, a second core layer composed of a copolymer of an alkyl (meth)acrylate monomer and an aromatic vinyl monomer formed on the outside of the first core layer, and a third core layer composed of a copolymer of an alkyl (meth)acrylate monomer and an aromatic vinyl monomer formed on the outside of the second core layer.

In exemplary embodiments, a weight ratio of the first rubber-modified acrylic graft copolymer to the second rubber-modified acrylic graft copolymer may range from about 2:1 to about 1:2.

In exemplary embodiments, the branched copolymer may be a polymer of a mixture including an aromatic vinyl compound, an unsaturated nitrile compound, and a silicone compound having at least two unsaturated reactive groups.

In exemplary embodiments, the silicone compound having at least two unsaturated reactive groups may be any one of compounds represented by the following Formula 1 or a mixture thereof:

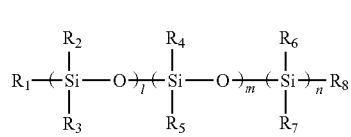

[Formula 1]

wherein l, m, and n are the same or different and are each independently an integer of 0 to 100 (with the proviso that l, m, and n are not all 0 at the same time); $R_1$ to $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, wherein $R_1$ and $R_8$ may be bonded to each other to form a ring structure; and wherein at least two of $R_1$ to $R_8$ include a polymerizable unsaturated reactive group.

In exemplary embodiments, the glass fibers may have an average length of about 0.1 mm to about 20 mm.

In exemplary embodiments, the thermoplastic resin composition may include about 0.01 parts by weight to about 5 parts by weight of the metal particles based on about 100 parts by weight of a base resin comprising about 20 wt % to about 70 wt % of the styrene-based copolymer resin, about 10 wt % to about 50 wt % of the rubber-modified acrylic graft copolymer, about 1 wt % to about 40 wt % of the silicone compound-containing branched copolymer, and about 1 wt % to about 30 wt % of the glass fibers.

The present invention also relates to a molded article. The molded article is produced using the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

The present inventors have conducted intensive studies to develop a thermoplastic resin composition having excellent appearance quality and capable of expressing a low-gloss metal texture. As a result, the present inventors found that the above can be achieved when a branched copolymer and glass fibers are used in a specific weight ratio together with a styrene-based copolymer resin containing metal particles, and completed the present invention.

When a branched copolymer and a glass fiber are used in combination with a styrene-based copolymer resin as in the present invention, a surface having a double irregular structure can be formed after molding due to a difference in particle size between the branched copolymer and the glass fibers, whereby appearance defects such as flow marks and weld lines can be prevented, thereby obtaining a molded article that can have excellent appearance quality and a low-gloss metal texture.

A thermoplastic resin composition according to the present invention includes: a base resin including (A) a styrene-based copolymer resin, (B) a rubber-modified acrylic graft copolymer, (C) a silicone compound-containing branched copolymer, and (D) glass fibers; and (E) metal particles.

Next, details of each component of the thermoplastic resin composition according to the present invention will be described.

(A) Styrene-Based Copolymer Resin

The styrene-based copolymer (A) may be a copolymer of a styrene monomer and a comonomer.

The styrene monomer may include substituted and/or unsubstituted styrene. The substituted styrene may be styrene in which at least one or more hydrogen atom(s) directly connected to a benzene ring is substituted with a $C_1$ to $C_8$ alkyl group and/or halogen group. Examples of the substituted styrene may include without limitation α-methylstyrene, p-methylstyrene, 2,4-dimethylstyrene, m-methylstyrene, o-methylstyrene, p-tert-butylstyrene, p-chlorostyrene, m-chlorostyrene, o-chlorostyrene, p-fluorostyrene, p-cyclohexylstyrene, and the like, and mixtures thereof.

Examples of the comonomer may include without limitation unsaturated nitrile compounds, (meth)acrylic acid alkyl ester compounds, maleic anhydride, maleimide compounds, and the like, and mixtures thereof.

Examples of the unsaturated nitrile compound may include without limitation acrylonitrile and/or methacrylonitrile. In exemplary embodiments, the unsaturated nitrile compound may include acrylonitrile. When acrylonitrile is used as the unsaturated nitrile compound, the resin composition can have improved mechanical strength and impact resistance.

The (meth)acrylic acid alkyl ester compound may be, for example, an ester of a $C_1$ to $C_8$ alkyl (meth)acrylic acid. The ester of a $C_1$ to $C_8$ alkyl (meth)acrylic acid may be, for example, an ester compound obtained from a $C_1$ to $C_8$ monohydric alcohol. Examples of the (meth)acrylic acid alkyl ester compound may include without limitation methyl (meth)acrylate, ethyl (meth)acrylate, propyl (meth)acrylate, butyl (meth)acrylate, and the like, and mixtures thereof.

The maleimide compound may be a maleimide substituted with a $C_1$ to $C_4$ alkyl group and/or a maleimide n-substituted with a phenyl group.

The styrene-based copolymer (A) may include about 50 wt % to 95 wt % of the styrene monomer and about 5 wt % to about 50 wt % of the comonomer, each based on the total weight (100 wt %) of the styrene-based copolymer (A).

In some embodiments, the styrene-based copolymer can include the styrene monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the styrene monomer can be in a range from about any of the foregoing amounts to about any other of the foregoing amounts.

In some embodiments, the styrene-based copolymer can include the comonomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the comonomer can be in a range from about any of the foregoing amounts to about any other of the foregoing amounts.

Within these ranges, the resin composition can exhibit improved properties in terms of processability, mechanical strength, and impact resistance.

Examples of the styrene-based copolymer (A) may include without limitation: a copolymer of styrene and acrylonitrile; a copolymer of styrene, acrylonitrile and methyl methacrylate; a copolymer of α-methylstyrene and acrylonitrile; a copolymer of α-methylstyrene, acrylonitrile and methyl methacrylate; a copolymer of styrene, α-methylstyrene, and acrylonitrile; a copolymer of styrene, α-methylstyrene, acrylonitrile and methyl methacrylate; and/or a copolymer of styrene and maleic anhydride.

The styrene-based copolymer (A) may be prepared by copolymerizing the styrene monomer with the comonomer through any typical known polymerization method such as emulsion polymerization, solution polymerization, suspension polymerization, and mass polymerization, without being limited thereto.

The styrene-based copolymer (A) may have a weight average molecular weight of about 15,000 g/mol to about 250,000 g/mol. Within this range, the thermoplastic resin composition can have further improved moldability.

The base resin can include the styrene-based copolymer (A) in an amount of about 20 wt % to about 70 wt %, for example about 25 wt % to about 65 wt %, and as another example about 25 wt % to about 50 wt %, based on the total weight (100 wt %) of the base resin. In some embodiments, the base resin can include the styrene-based copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments, the amount of the styrene-based copolymer can be in a range from about any of the foregoing amounts to about any other of the foregoing amounts.

Within this range, it is possible to obtain a thermoplastic resin composition which can have a low-gloss metal texture and can have excellent processability, mechanical strength, and impact resistance.

(B) Rubber-Modified Acrylic Graft Copolymer

The rubber-modified acrylic graft copolymer (B) may be a copolymer of an acrylic rubbery polymer and at least one vinyl monomer.

The rubber-modified acrylic graft copolymer (B) may be produced by adding a vinyl monomer copolymerizable with an acrylic rubbery polymer in the presence of the acrylic rubbery polymer, followed by graft polymerization. Here, graft polymerization may be performed through any typical known polymerization method such as emulsion polymerization, solution polymerization, suspension polymerization, and mass polymerization. Thereamong, emulsion polymerization or mass polymerization can be useful in terms of adjustment of graft rate, yield, and molecular weight.

In exemplary embodiments, the rubber-modified acrylic graft copolymer (B) may be a core-shell type copolymer including a core including an acrylic rubbery polymer and a shell formed by grafting at least one vinyl monomer to the core. Here, the core may have a single-layer structure or may include two or more layers of different components.

Examples of the acrylic rubbery polymer forming the core may include without limitation polymers of one or more alkyl (meth)acrylate monomers, copolymers of alkyl (meth)acrylate and an aromatic vinyl monomer, and the like, and mixtures thereof.

The alkyl (meth) acrylate monomer of the acrylic rubbery polymer may be a $C_4$ to $C_{20}$ alkyl (meth) acrylate. Examples of the alkyl (meth)acrylate monomers can include without limitation butyl (meth)acrylate, hexyl (meth)acrylate, ethylhexyl (meth)acrylate, stearyl (meth)acrylate, lauryl (meth)acrylate, and the like, and mixtures thereof. In exemplary embodiments, the alkyl (meth) acrylate monomer of the acrylic rubbery polymer can include butyl (meth)acrylate.

The vinyl monomer forming the shell may include at least one of an alkyl (meth)acrylate monomer, an aromatic vinyl monomer, an unsaturated nitrile monomer, and/or a maleimide monomer. In exemplary embodiments, the shell can be formed of a mixture of an aromatic vinyl monomer and an unsaturated nitrile monomer.

The alkyl (meth)acrylate monomer may be a $C_1$ to $C_8$ alkyl (meth)acrylate. Examples of the alkyl (meth)acrylate monomer can include without limitation methyl (meth)acrylate, ethyl (meth)acrylate, propyl (meth)acrylate, butyl (meth)acrylate, and the like, and mixtures thereof.

The aromatic vinyl monomer may be include, for example, substituted and/or unsubstituted styrene. The term substituted styrene refers to a styrene in which at least one or more hydrogen atom(s) directly connected to a benzene ring is substituted with a $C_1$ to $C_8$ alkyl group and/or halogen group. Examples of the substituted styrene may include without limitation α-methylstyrene, p-methylstyrene, 2,4-dimethylstyrene, m-methylstyrene, p-tert-butylstyrene, p-chlorostyrene, m-chlorostyrene, o-chlorostyrene, p-fluorostyrene, p-cyclohexylstyrene, and the like, and mixtures thereof.

Examples of the unsaturated nitrile compound may include without limitation acrylonitrile, methacrylonitrile, ethacrylonitrile, and the like, and mixtures thereof.

Examples of the maleimide monomer may include without limitation a maleimide substituted with a $C_1$ to $C_4$ alkyl, a maleimide N-substituted with a phenyl group, and the like, and mixtures thereof.

The base resin can include the rubber-modified acrylic graft copolymer (B) in an amount of about 10 wt % to about 50 wt %, for example about 15 wt % to about 45 wt %, and as another example about 20 wt % to about 40 wt %, based on the total weight (100 wt %) of the base resin. In some embodiments, the base resin can include the rubber-modified acrylic graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the rubber-modified acrylic graft copolymer can be in a range from about any of the foregoing amounts to about any other of the foregoing amounts.

Within this range, it is possible to obtain a thermoplastic resin composition having excellent impact resistance, mechanical properties, and colorability.

The rubber-modified acrylic graft copolymer according to the present invention may include two rubber-modified acrylic graft copolymers having different core components and/or different core sizes. When two rubber-modified acrylic graft copolymers having different core components and/or different core sizes are used, as in the present invention, it is possible to further improve impact resistance and impact efficiency of the resin composition.

For example, the thermoplastic resin composition according to the present invention may include a first rubber-modified acrylic graft copolymer and a second rubber-modified acrylic graft copolymer having different core components and/or different core sizes. Next, the first rubber-modified acrylic graft copolymer and the second rubber-modified acrylic graft copolymer will be described.

(B-1) First Rubber-Modified Acrylic Graft Copolymer

The first rubber-modified acrylic graft copolymer (B-1) can be a core-shell type rubber-modified acrylic graft copolymer and may have an average core diameter (volume based, measured by a scanning electron microscope (SEM)) of about 100 nm to about 250 nm, for example about 100 nm to about 200 nm, and as another example about 150 nm to about 200 nm. Within this range, it is possible to maximize impact-modifying effects while improving colorability and low-gloss properties of the resin composition.

The first rubber-modified acrylic graft copolymer (B-1) may have a double core. The double core may include, for example, an inner core layer formed by copolymerizing an alkyl (meth)acrylate monomer with an aromatic vinyl monomer (for example, a copolymer formed of monomers consisting of alkyl (meth)acrylate monomer and aromatic vinyl monomer) and an outer core layer composed of (for example consisting of) an alkyl (meth)acrylate polymer.

For example, the first rubber-modified acrylic graft copolymer may include: an acrylic rubbery polymer core including an inner core layer composed of a copolymer of an alkyl (meth)acrylate monomer and an aromatic vinyl monomer and an outer core layer composed of an alkyl (meth)acrylate polymer; and a shell layer formed by grafting a copolymer of an aromatic vinyl monomer and an unsaturated nitrile monomer to the acrylic rubbery polymer core.

As used herein, the term alkyl (meth)acrylate polymer refers to a polymer of an alkyl (meth)acrylate monomer, for example, consisting of alkyl (meth)acrylate monomer(s).

Examples of the alkyl (meth)acrylate monomer, the aromatic vinyl monomer, and the unsaturated nitrile monomer are the same as those described above.

In exemplary embodiments, the first rubber-modified acrylic graft copolymer can include about 55 wt % to about 65 wt % of the acrylic rubbery polymer core and about 35 wt % to about 45 wt % of the shell layer, for example about 58 wt % to about 62 wt % of the acrylic rubbery polymer core and about 38 wt % to about 42 wt % of the shell layer, based on the total weight (100 wt %) of the first rubber-modified acrylic graft copolymer.

In some embodiments, the first rubber-modified acrylic graft copolymer can include the acrylic rubbery polymer core in an amount of about 55, 56, 57, 58, 59, 60, 61, 62, 63, 64, or 65 wt %. Further, according to some embodiments, the amount of the acrylic rubbery polymer core can be in a range from about any of the foregoing amounts to about any other of the foregoing amounts.

In some embodiments, the first rubber-modified acrylic graft copolymer can include the shell layer in an amount of about 35, 36, 37, 38, 39, 40, 41, 42, 43, 44, or 45 wt %. Further, according to some embodiments, the amount of the shell layer can be in a range from about any of the foregoing amounts to about any other of the foregoing amounts.

In this case, impact efficiency can be increased; productivity can be high, such that the amount of residual monomers and oligomers can be reduced; a graft rate can be sufficiently increased; and appearance characteristics, impact resistance, and colorability of a final molded article can be improved.

(B-2) Second Rubber-Modified Acrylic Graft Copolymer

The second rubber-modified acrylic graft copolymer (B-2) can be a core-shell type rubber-modified acrylic graft copolymer and may have an average core size (volume based, measured by a scanning electron microscope (SEM)) of about 251 nm to about 400 nm, for example about 251 nm to about 350 nm, and as another example about 300 nm to about 350 nm. Within this range, the resin composition can have excellent impact resistance and colorability.

The second rubber-modified acrylic graft copolymer (B-2) may have a triple core. The triple core may include a first core layer composed of (for example consisting of) an alkyl (meth)acrylate polymer, a second core layer composed of a copolymer of an alkyl (meth)acrylate monomer and an aromatic vinyl monomer formed on the outside of the first core layer (for example, a copolymer formed of monomers consisting of alkyl (meth)acrylate monomer and aromatic vinyl monomer), and a third core layer composed of a copolymer of an alkyl (meth)acrylate monomer and an aromatic vinyl monomer formed on the outside of the second core layer (for example, a copolymer formed of monomers consisting of alkyl (meth)acrylate monomer and aromatic vinyl monomer), wherein, the second core layer and the third core layer may be formed of the same types of monomer, but in different amounts.

For example, the second rubber-modified acrylic graft copolymer may include: an acrylic rubbery polymer core including a first core layer composed of an alkyl (meth)acrylate polymer, a second core layer composed of a copolymer of an alkyl (meth)acrylate monomer and an aromatic vinyl monomer formed on the outside of the first core layer, and a third core layer composed of a copolymer of an alkyl (meth)acrylate monomer and an aromatic vinyl monomer formed on the outside of the second core layer; and a shell layer formed by grafting an aromatic vinyl monomer and an unsaturated nitrile monomer to the third core layer.

As used herein, the term alkyl (meth)acrylate polymer refers to a polymer of an alkyl (meth)acrylate monomer, for example, consisting of alkyl (meth)acrylate monomer(s).

Examples of the alkyl (meth)acrylate monomer, the aromatic vinyl monomer, and the unsaturated nitrile monomer are the same as those described above.

When the second rubber-modified acrylic graft copolymer having the triple core is used, impact efficiency in a domain of the styrene-based resin can be significantly improved.

In exemplary embodiments, the second rubber-modified acrylic graft copolymer can include about 55 wt % to about 65 wt % of the acrylic rubbery polymer core and 35 wt % to about 45 wt % of the shell layer, for example, about 58 wt % to about 62 wt % of the acrylic rubbery polymer core and about 38 to about 42 wt % of the shell layer, based on the total weight (100 wt %) of the first rubber-modified acrylic graft copolymer.

In some embodiments, the second rubber-modified acrylic graft copolymer can include the acrylic rubbery polymer core in an amount of about 55, 56, 57, 58, 59, 60, 61, 62, 63, 64, or 65 wt %. Further, according to some embodiments, the amount of the acrylic rubbery polymer core can be in a range from about any of the foregoing amounts to about any other of the foregoing amounts.

In some embodiments, the second rubber-modified acrylic graft copolymer can include the shell layer in an amount of about 35, 36, 37, 38, 39, 40, 41, 42, 43, 44, or 45 wt %. Further, according to some embodiments, the amount of the shell layer can be in a range from about any of the foregoing amounts to about any other of the foregoing amounts.

In a shell layer, a content ratio of the aromatic vinyl monomer to the unsaturated nitrile monomer can range from about 3:1 to about 1.5:1, for example about 2.5:1 to about 2:1. If the content ratio is outside of the above range, the impact efficiency can be lowered and the problem of dispersibility can arise.

In the second rubber-modified acrylic graft copolymer, the acrylic rubbery polymer core can have a weight average molecular weight of about 200,000 g/mol to about 10,000,000 g/mol, and the shell layer can have a weight average molecular weight of about 50,000 g/mol to about 500,000 g/mol.

When the first rubber-modified acrylic graft copolymer and the second rubber-modified acrylic graft copolymer are both used, a weight ratio of the first rubber-modified acrylic graft copolymer to the second rubber-modified acrylic graft copolymer may range from about 2:1 to about 1:2, for example about 1:1 to about 1:2, and as another example about 1:1 to about 1:1.5. Within this range of weight ratio, the resin composition can have further improved impact resistance and impact efficiency.

(C) Silicone Compound-Containing Branched Copolymer

The silicone compound-containing branched copolymer (C) is used to improve appearance characteristics of the thermoplastic resin composition. The silicone compound-containing branched copolymer (C) may be prepared from a mixture including (C-1) an aromatic vinyl compound, (C-2) an unsaturated nitrile compound, and (C-3) a silicone compound having two or more unsaturated reactive groups. Next, details of each component of the silicone compound-containing branched copolymer will be described.

(C-1) Aromatic Vinyl Compound

Examples of the aromatic vinyl compound (C-1) used in preparation of the (C) branched copolymer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and combinations thereof.

For example, the aromatic vinyl compound may include styrene and/or α-methylstyrene.

The monomer mixture for preparing the branched copolymer can include the aromatic vinyl compound in an amount of about 60 wt % to about 80 wt % based on the total weight (100 wt %) of the monomer mixture for preparing the branched copolymer. In some embodiments, the monomer mixture can include the aromatic vinyl compound in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the aromatic vinyl compound can be in a range from about any of the foregoing amounts to about any other of the foregoing amounts.

Within this range, the thermoplastic resin composition can have improved impact strength and heat resistance.

(C-2) Unsaturated Nitrile Compound

Examples of the unsaturated nitrile compound (C-2) used in preparation of the branched copolymer may include without limitation acrylonitrile, methacrylonitrile, ethacrylonitrile, phenyl acrylonitrile, α-chloroacrylonitrile, fumaronitrile, and the like, and combinations thereof. In exemplary embodiments, the unsaturated nitrile compound may include acrylonitrile.

The monomer mixture for preparing the branched copolymer can include the unsaturated nitrile compound in an amount of about 20 wt % to about 40 wt % based on the total weight (100 wt %) of the monomer mixture for preparing the branched copolymer. In some embodiments, the monomer mixture can include the unsaturated nitrile compound in an amount of about 20, 21, 22, 23, 24, 25, 26, 27, 28, 29, 30, 31, 32, 33, 34, 35, 36, 37, 38, 39, or 40 wt %. Further, according to some embodiments, the amount of the unsaturated nitrile compound can be in a range from about any of the foregoing amounts to about any other of the foregoing amounts.

In the monomer mixture for preparing the branched copolymer, a weight ratio of the aromatic vinyl compound to the unsaturated nitrile compound (aromatic vinyl compound: unsaturated nitrile compound) can range from about 7:3 to about 9:1. Within this range, it is possible to minimize deterioration in mechanical properties and moldability of the thermoplastic resin composition.

(C-3) Silicone Compound

The silicone compound (C-3) may be a silicone compound having at least two unsaturated reactive groups. The silicone compound having at least two unsaturated reactive groups may include any one of compounds represented by the following Formula 1 or a mixture thereof:

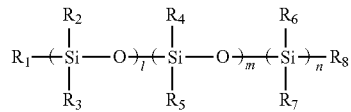

[Formula 1]

wherein l, m, and n are the same or different and are each independently an integer of 0 to 100 (with the proviso that l, m, and n are not all 0 at the same time); $R_1$ to $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, wherein $R_1$ and $R_8$ may be bonded to each other to form a ring structure, and wherein at least two of $R_1$ to $R_8$ include a polymerizable unsaturated reactive group.

The compounds may have a linear or cyclic structure.

As used herein, unless otherwise defined, the term "substituted" means that a hydrogen atom in a functional group is substituted with at least one substituent, for example, one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof.

Also as used herein, unless otherwise defined, the term "hetero" refers to at least one hetero atom of N, O, S and/or P, instead of at least one carbon atom of a cyclic substituent.

In exemplary embodiments, the silicone compound (C-3) according to the present invention may be represented by the following Formula 2:

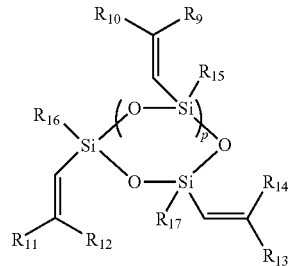

[Formula 2]

wherein $R_9$ to $R_{14}$ are the same or different and are each independently hydrogen, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{15}$ to $R_{17}$ are the same or different and are each independently hydrogen or a substituted or unsubstituted $C_1$ to $C_6$ alkyl group; and p is an integer of 1 to 6.

Examples of the silicone compound having two or more unsaturated reactive groups may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra-sec-butyl-1,3,5,7-tetravinyl-cyclotetrasiloxane, 1,3,5,7,9-penta-sec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-pentaisopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaisopropyl-cyclopentasiloxane, 1,3,5-tri-sec-butyl-1,3,5-trimethyl-cyclotrisiloxane, 1,3,5,7-tetra-sec-butyl-1,3,5,7-tetramethyl-cyclotetrasiloxane, 1,3,5,7,9-penta-sec-1,3,5,7,9-pentamethyl-cyclopentasiloxane, 1,3,5-tri-sec-butyl-1,3,5-triethyl-cyclotrisiloxane, 1,3,5,7-tetra-sec-butyl-1,3,5,7-tetraethyl-cyclotetrasiloxane, 1,3,5,7,9-penta-sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri-sec-butyl-cyclotrisiloxane, 1,3,5,7-tetra-sec-butyl-cyclotetrasiloxane, 1,3,5,7,9-penta-sec-butyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and combinations thereof. In exemplary embodiments, the silicone compound having two or more unsaturated reactive groups may include 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane. For example, the silicone compound having two or more unsaturated reactive groups may include 1,3,5,7-tetramethyl-1,3,5,7-tetravinyl-cyclotetrasiloxane.

The silicone compound having at least two unsaturated reactive groups may have a molecular weight or weight average molecular weight of about 150 g/mol to about 6,000 g/mol. Within this range, a degree of crosslinking can be easily controlled and a crosslinking reaction can progress smoothly, such that the branched copolymer can be easily prepared.

The monomer mixture for preparing the branched copolymer can include the silicone compound in an amount of about 0.1 parts by weight to about 10 parts by weight, for example about 0.1 parts by weight to about 8 parts by weight, and as another example about 0.5 parts by weight to about 5 parts by weight, based on about 100 parts by weight of the aromatic vinyl compound and the unsaturated nitrile compound. In some embodiments, the monomer mixture can include the silicone compound in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the silicone compound can be in a range from about any of the foregoing amounts to about any other of the foregoing amounts.

The mixture used in preparation of the branched copolymer may further include at least one polyfunctional vinyl compound, which is not the same as the silicone compound (C-3) described herein. Examples of the silicone compound can include without limitation divinyl polydimethylsiloxane, vinyl-modified dimethylsiloxane, divinyl benzene, ethylene glycol di(meth)acrylate, allyl (meth)acrylate, diallyl phthalate, diallyl maleate, triallyl isocyanurate, and the like, and combinations thereof.

The monomer mixture for preparing the branched copolymer can include the polyfunctional vinyl compound in an amount of about 0.001 parts by weight to about 10.0 parts by weight, for example about 0.01 parts by weight to about 3.0 parts by weight, based on about 100 parts by weight of the aromatic vinyl compound and the unsaturated nitrile compound. In some embodiments, the monomer mixture can include the polyfunctional vinyl compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the polyfunctional vinyl compound can be in a range from about any of the foregoing amounts to about any other of the foregoing amounts.

The branched copolymer according to the present invention may have a glass transition temperature (Tg) of about 95° C. to about 115° C. Within this range, the branched copolymer can provide excellent appearance quality with minimal or no deterioration of physical properties of the thermoplastic resin composition including the branched copolymer.

The branched copolymer may be prepared by any typical polymerization method such as suspension polymerization, emulsion polymerization, and solution polymerization, without being limited thereto. In exemplary embodiments, the branched copolymer may be prepared by suspension polymerization. When the branched copolymer is prepared by suspension polymerization, an inorganic dispersant and/or an organic dispersant may be used to improve dispersibility. Examples of the organic dispersant can include without limitation homopolymer(s) and/or copolymer(s) of acrylic acid and/or methacrylic acid. When the copolymer is used as the organic dispersant, the acrylic acid and/or the methacrylic acid may be used in an amount of about 50 parts by weight or more based on about 100 parts by weight of the copolymer. In addition, the acrylic acid and/or the methacrylic acid can be in the form of a salt of sodium, potassium and/or ammonium to maintain adequate solubility.

A polymerization initiator such as but not limited to azobisisobutyronitrile can be used in copolymerization of the branched copolymer.

The branched copolymer may have an average particle diameter (volume based, measured by a scanning electron microscope (SEM)) of about 0.1 μm to about 5 μm, for example about 1 μm to about 3 μm, and as another example about 1 μm to about 2 μm. When the average particle diameter of the branched copolymer satisfies the above range, a double irregular surface structure can be formed after molding due to a difference in size from glass fibers to be described below, and surface defects such as flow marks and weld lines can be effectively concealed.

The base resin can include the branched copolymer (C) in an amount of about 1 wt % to about 40 wt %, for example about 1 wt % to about 30 wt %, and as another example about 5 wt % to about 30 wt %, based on the total weight (100 wt %) of the base resin. In some embodiments, the base resin can include the branched copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the branched copolymer can be in a range from about any of the foregoing amounts to about any other of the foregoing amounts. Within this range, it is possible to obtain a thermoplastic resin providing excellent appearance-defect concealment and exhibiting excellent low-gloss properties.

(D) Glass Fibers

The glass fibers (D) are used together with the branched copolymer (C) to improve appearance characteristics of the thermoplastic resin composition.

The glass fibers (D) may have an average length (L) of about 0.1 mm to about 20 mm, for example about 0.3 to about 10 mm, and an average diameter (R) of about 1 μm to about 20 μm, for example about 5 μm to about 20 μm. The glass fibers (D) may have an aspect ratio (L/R) of about 10 to about 2,000, for example about 30 to about 1,000. The glass fibers (D) may be surface-treated with epoxy, urethane, and the like.

The base resin can include the glass fibers (D) in an amount of about 1 wt % to about 30 wt %, for example about 1 wt % to about 25 wt %, and as another example about 1 wt % to about 20 wt %, based on the total weight of the base resin. In some embodiments, the base resin can include the glass fibers in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments, the amount of the glass fibers can be in a range from about any of the foregoing amounts to about any other of the foregoing amounts.

When the amount of the glass fibers (D) falls within the above range, it is possible to obtain a thermoplastic resin providing excellent appearance-defect concealment and having excellent low-gloss properties and mechanical properties.

The thermoplastic resin composition according to the present invention includes the branched copolymer (C) and the glass fibers (D) in a weight ratio of about 1:1 to about 6:1, for example about 2:1 to about 6:1. When the weight ratio of the branched copolymer (C) to the glass fibers (D) falls within the above range, the thermoplastic resin composition can provide excellent appearance-defect concealment and can have excellent low-gloss properties. If the amount of the branched copolymer (C) is smaller than that of the glass fibers (D), the effect of concealing appearance defects can be insignificant, whereas, if the branched copolymer (C) is used in excess, mechanical properties of the thermoplastic resin can deteriorate.

(E) Metal Particles

The metal particles (E) are used to impart a metal texture to the thermoplastic resin composition. Examples of the metal particles can include without limitation aluminum, gold, copper, and the like, and combinations thereof.

The metal particles can have a spherical shape rather than a flake shape to help minimize appearance defects. In addition, the metal particles may have an average particle diameter (volume based, measured by a scanning electron microscope (SEM)) of about 1 μm to about 150 μm, for example about 5 μm to about 100 μm, and as another example about 10 μm to about 50 μm. Within this range, it is possible to improve surface characteristics of the thermoplastic resin composition.

In exemplary embodiments, the metal particles (E) may be formed by depositing a metal material such as aluminum, gold, and/or copper on surfaces of organic and/or inorganic particles. For example, the metal particles (E) may be formed by depositing aluminum (Al) on silicon dioxide, without being limited thereto.

The thermoplastic resin composition can include the metal particles (E) in an amount of about 0.01 parts by weight to about 5 parts by weight, for example about 0.01 parts by weight to about 3 parts by weight, and as another example about 0.01 parts by weight to about 1 part by weight, based on about 100 parts by weight of the base resin.

In some embodiments, the thermoplastic resin composition can include the metal particles in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments, the amount of the metal particles can be in a range from about any of the foregoing amounts to about any other of the foregoing amounts.

When the amount of the metal particles (E) falls within the above range, it is possible to obtain a thermoplastic resin that can have excellent mechanical properties and moldability and capable of realizing a metal texture.

(F) Other Components

The thermoplastic resin composition according to the present invention may further include one or more additives. Examples of the additives can include without limitation antimicrobial agents, heat stabilizers, antioxidants, release agents, light stabilizers, surfactants, coupling agents, plasticizers, admixtures, colorants, lubricants, antistatic agents, flame retardants, weather-resistance agents, UV absorbers, adhesion promoters, adhesives, and the like. These may be used alone or in combination thereof.

Examples of the antioxidant can include without limitation phenol, phosphite, thioether and/or amine antioxidants.

Examples of the release agent can include without limitation fluorine-containing polymers, silicone oils, metal salts of stearic acid, metal salts of montanic acid, montanic ester waxes, polyethylene waxes, and the like, and mixtures thereof.

Examples of the weather-resistance agent can include without limitation benzophenone, benzotriazole and/or phenyl triazine weather-resistance agents.

The additives may be suitably included in an amount within a range that does not impair the physical properties of the resin composition. For example, the additives may be present in an amount of about 40 parts by weight or less, for example, about 0.1 parts by weight to about 30 parts by weight relative to about 100 parts by weight of the base resin. In some embodiments, the thermoplastic resin composition can include one or more additives in an amount of 0 (the additive(s) is not present), about 0 (the additive(s) is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments, the amount of the additive(s) can be in a range from about any of the foregoing amounts to about any other of the foregoing amounts. Within this range, a molded article can exhibit further improved physical properties according to an intended purpose.

The thermoplastic resin composition as set forth above may be prepared by any typical method. For example, the above components and additives may be mixed, followed by melt extrusion in an extruder, thereby preparing a thermoplastic resin in pellet form.

The thermoplastic resin composition according to the present invention can have high flowability and thus can have excellent processability. For example, the thermoplastic resin composition according to the present invention can have a flow index of about 5 g/10 min or higher, for example about 6 g/10 min or higher, for example about 6 g/10 min to about 10 g/10 min, as measured at a temperature of 220° C. under a load of 10 kg in accordance with ASTM D1238.

In addition, the thermoplastic resin composition according to the present invention can have high impact resistance after molding. For example, the thermoplastic resin composition can have an Izod impact strength of about 5 kgf·cm/ cm or higher, for example about 6 kgf·cm/cm or higher, for example about 6 kgf·cm/cm to about 15 kgf·cm/cm, as measured on a ⅛" thick specimen prepared from the thermoplastic resin composition at 23° C. in accordance with ASTM D256.

Other embodiments of the present invention provide a molded article produced using the thermoplastic resin composition as set forth above.

The molded article produced using the thermoplastic resin composition according to the present invention can have a high-quality low-gloss metal texture. For example, the molded article according to the present invention can have a gloss of about 30% or less, for example about 0% to about 30%, as measured at a reflection angle of 60° in accordance with ASTM D523 and a flop index of about 10 or higher, for example about 12 or higher, for example about 12 to about 15.

The molded article may be produced by various processes known in the art, such as but not limited to injection molding, blow molding, extrusion, and thermoforming. In the molded article according to the present invention, surface defects due to flow marks and weld lines may be hardly observed.

In addition, the molded article may be used to make various molded articles with a luxurious metal texture, for example but not limited to, IT products, appliances, automobile interior/exterior products, furniture, interior products, and plastic exterior products such as general goods.

Next, the present invention will be described in more detail with reference to the following examples. It should be understood that these examples are provided for illustration only and are not to be construed in any way as limiting the present invention.

EXAMPLES

Details of components used in the following Examples and Comparative Examples are as follows.

(A) Styrene-Based Copolymer

A styrene-acrylonitrile (SAN) copolymer resin (weight average molecular weight: 163,000 g/mol) prepared by suspension polymerization of 76 wt % of styrene and 24 wt % of acrylonitrile.

(B) Rubber-Modified Acrylic Graft Copolymer (B-1) First Rubber-Modified Acrylic Graft Copolymer A graft copolymer prepared by grafting 50 parts by weight of a monomer mixture including 33 wt % of acrylonitrile and 67 wt % of styrene to 50 parts by weight of a rubbery polymer having a double core structure composed of an inner core of a copolymer of butyl acrylate and styrene and an outer core of butyl acrylate rubber through emulsion polymerization. Here, the cores have a diameter of 180 nm.

(B-2) Second Rubber-Modified Acrylic Graft Copolymer

A graft copolymer prepared by grafting 40 parts by weight of a monomer mixture including 33 wt % of acrylonitrile and 67 wt % of styrene to 60 parts by weight of a rubbery polymer having a triple core structure composed of a first core layer of butyl acrylate rubber, a second core layer of a copolymer of butyl acrylate and styrene, and a third core layer of a copolymer of butyl acrylate and styrene through emulsion polymerization. Here, the cores have a diameter of 320 nm.

(C) Branched Copolymer

A branched copolymer (weight average molecular weight: 150,000 g/mol) prepared by suspension polymerization of 73.7 wt % of styrene, 23.3 wt % of acrylonitrile, and 2 wt % of 1,3,5,7-tetramethyltetravinylcyclotetrasiloxane.

(D) Glass Fibers

Epoxy-coated glass fiber, 183F (Korea Owens Corning Co., Ltd., average diameter (R): 13 μm, average length: 3 mm).

(E) Metal Particles:

SAOMAI SM 2515 Metal Fine Silver (Youngbio Chemical, grade: SM 2515, average particle diameter: 10 μm to 50 μm).

Examples 1 to 2 and Comparative Examples 1 to 5

The components (A) to (E) are mixed in amounts as listed in Table 1, thereby preparing thermoplastic resin compositions. In Table 1, the amounts of (A), (B), (C) and (D) are represented in % by weight (wt %) based on the total weight (100 wt %) of the base resin and the amount of (E) is represented in parts by weight relative to 100 parts by weight of the base resin.

TABLE 1

|  |  | Example | | Comparative Example | | | | |
|---|---|---|---|---|---|---|---|---|
|  |  | 1 | 2 | 1 | 2 | 3 | 4 | 5 |
| Base resin | (A) | 40 | 30 | 40 | 40 | 40 | 15 | 40 |
|  | (B) (B-1) | 16 | 16 | 16 | 16 | 16 | 16 | 16 |
|  | (B-2) | 24 | 24 | 24 | 24 | 24 | 24 | 24 |
|  | (C) | 15 | 15 | 20 | — | 5 | 40 | 15 |
|  | (D) | 5 | 15 | — | 20 | 15 | 5 | 5 |
| (E) |  | 0.3 | 0.3 | 0.3 | 0.3 | 0.3 | 0.3 | 0 |

Each of the thermoplastic resin compositions is subjected to extrusion using a twin-screw extruder at 240° C., thereby preparing specimens in pellet form. Each of the specimens is evaluated as to the following properties. Results are shown in Table 2.

Property Evaluation (1) Impact resistance: Izod impact strength (unit: kgf·cm/cm) is measured on a ⅛" thick notched specimen prepared from each of the thermoplastic resin compositions of the Examples and Comparative Examples at 23° C. in accordance with ASTM D256.

(2) Processability (unit: g/10 min): Melt index is measured on pellets prepared from each of the thermoplastic resin compositions of the Examples and Comparative Examples at 220° C. under a load of 10 kg in accordance with ASTM D1238.

(3) Gloss (unit: %): Gloss is measured on a specimen prepared from each of the thermoplastic resin compositions of the Examples and Comparative Examples at a reflection angle of 60° in accordance with ASTM D523.

(4) Metal texture: Flop index is measured on a specimen prepared from each of the thermoplastic resin compositions of the Examples and Comparative Examples using a BYK Mac color spectrophotometer (BYK Co., Ltd.).

(5) Appearance: A specimen prepared from each of the thermoplastic resin compositions of the Examples and Comparative Examples is observed with the naked eye to evaluate appearance quality according to the following criteria:

⊚: No color difference in both of flow marks and weld lines

○: Slight color difference in weld lines

Δ: Moderate color difference in both flow marks and weld lines x: Severe color difference in both flow marks and weld lines

TABLE 2

| | Impact resistance (kgf · cm/cm) | Processability (g/10 min) | Gloss (%) | Metal texture | Appearance |
|---|---|---|---|---|---|
| Example 1 | 8.6 | 6.3 | 28 | 12~13 | ⊚ |
| Example 2 | 6.3 | 6.1 | 23 | 12~13 | ⊚ |
| Comparative Example 1 | 9.5 | 5.3 | 40 | 12~13 | Δ |
| Comparative Example 2 | 4.1 | 9.0 | 48 | 12~13 | X |
| Comparative Example 3 | 6.5 | 8.4 | 33 | 12~13 | ○ |
| Comparative Example 4 | 6.9 | 2.2 | 20 | 12~13 | ⊚ |
| Comparative Example 5 | 8.9 | 6.3 | 27 | 5 | ⊚ |

As shown in Table 2, it can be seen that the resin compositions of Examples 1 and 2 exhibit excellent properties in terms of impact resistance, flowability, low-gloss, metal texture, and surface characteristics. Conversely, the resin composition of Comparative Example 1 which does not include the glass fibers exhibits poor properties in terms of processability, low-gloss and appearance quality, and the resin composition of Comparative Example 2 which does not include the branched copolymer exhibits poor properties in terms of impact resistance, low-gloss and appearance quality. In addition, the resin compositions of Comparative Examples 3 and 4 in which a mixing ratio of the glass fibers to the branched copolymer is outside of the range of the present invention exhibit poor properties in terms of gloss or processability, and the resin composition of Comparative Example 5 which does not include the metal particles could not realize a metal texture.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. The scope of the present invention should be defined by the appended claims and equivalents thereof.

What is claimed is:

1. A thermoplastic resin composition, comprising:
   about 100 parts by weight of a base resin comprising about 20 wt % to about 70 wt % of a styrene-based copolymer resin; about 10 wt % to about 50 wt % of a rubber-modified acrylic graft copolymer; about 1 wt % to about 40 wt % of a silicone compound-containing branched copolymer; and about 1 wt % to about 30 wt % of glass fibers; and
   about 0.01 parts by weight to about 5 parts by weight of metal particles,
   wherein a weight ratio of the branched copolymer to the glass fibers ranges from about 1:1 to about 6:1,
   wherein the thermoplastic resin composition has a gloss of about 30% or less, as measured at a refection angle of 60° in accordance with ASTM D523 and a flow index of about 5 g/10 min or higher, as measured at a temperature of 220° C. under a load of 10 kg in accordance with ASTM D1238.

2. The thermoplastic resin composition according to claim 1, wherein the rubber-modified acrylic graft copolymer comprises a first rubber-modified acrylic graft copolymer having a core-shell structure and a second rubber-modified acrylic graft copolymer having a core-shell structure, wherein the first rubber-modified acrylic graft copolymer and the second rubber-modified acrylic graft copolymer have different core components and/or different core sizes.

3. The thermoplastic resin composition according to claim 2, wherein the first rubber-modified acrylic graft copolymer has an average core diameter of about 100 to about 250 nm and the second rubber-modified acrylic graft copolymer has an average core diameter of about 251 nm to about 400 nm.

4. The thermoplastic resin composition according to claim 2, wherein the first rubber-modified acrylic graft copolymer has a double core.

5. The thermoplastic resin composition according to claim 4, wherein the double core comprises an inner core layer formed by copolymerizing an alkyl (meth)acrylate monomer with an aromatic vinyl monomer and an outer core layer comprising an alkyl (meth)acrylate polymer.

6. The thermoplastic resin composition according to claim 2, wherein the second rubber-modified acrylic graft copolymer has a triple core.

7. The thermoplastic resin composition according to claim 6, wherein the triple core comprises a first core layer comprising an alkyl (meth)acrylate polymer, a second core layer comprising a copolymer of an alkyl (meth)acrylate monomer and an aromatic vinyl monomer formed on the outside of the first core layer, and a third core layer comprising a copolymer of an alkyl (meth)acrylate monomer and an aromatic vinyl monomer formed on the outside of the second core layer.

8. The thermoplastic resin composition according to claim 2, wherein a weight ratio of the first rubber-modified acrylic graft copolymer to the second rubber-modified acrylic graft copolymer ranges from about 2:1 to about 1:2.

9. The thermoplastic resin composition according to claim 1, wherein the branched copolymer is a polymer of a mixture comprising an aromatic vinyl compound, an unsaturated nitrile compound, and a silicone compound having at least two unsaturated reactive groups.

10. The thermoplastic resin composition according to claim 9, wherein the silicone compound having at least two unsaturated reactive groups comprises a compound represented by the following Formula 1 or a mixture thereof:

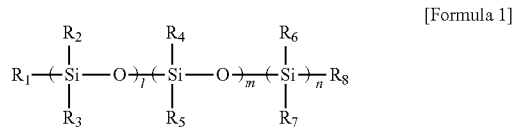

[Formula 1]

wherein l, m, and n are the same or different and are each independently an integer of 0 to 100, with the proviso that l, m, and n are not all 0 at the same time; $R_1$ to $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxy group, an alkoxy group, an amino group, an epoxy group, a carboxyl group, a halogen group, an ester group, an isocyanate group, or a mercapto group, wherein $R_1$ and $R_8$ may be bonded to each other to form a ring structure and wherein at least two of $R_1$ to $R_8$ include a polymerizable unsaturated reactive group.

11. The thermoplastic resin composition according to claim 1, wherein the glass fibers have an average length of about 0.1 mm to about 20 mm.

12. The thermoplastic resin composition according to claim 1, wherein the thermoplastic resin composition has a gloss of about 0% to about 30%, as measured at a refection angle of 60° in accordance with ASTM D523 and a flow index of about 6 g/10 min to about 10 g/10 min, as measured at a temperature of 220° C. under a load of 10 kg in accordance with ASTM D1238.

13. A molded article produced using the thermoplastic resin composition according to claim 1.

* * * * *